(12) United States Patent
Nishino

(10) Patent No.: US 12,296,389 B2
(45) Date of Patent: May 13, 2025

(54) METHOD FOR MANUFACTURING SLASH MOLDING MOLD

(71) Applicant: EPOCH COMPANY, LTD., Tokyo (JP)

(72) Inventor: Koichi Nishino, Tokyo (JP)

(73) Assignee: EPOCH COMPANY, LTD., Tokyo (JP)

(*) Notice: Subject to any disclaimer, the term of this patent is extended or adjusted under 35 U.S.C. 154(b) by 0 days.

(21) Appl. No.: 17/992,133

(22) Filed: Nov. 22, 2022

(65) Prior Publication Data

US 2024/0165709 A1 May 23, 2024

(51) Int. Cl.
| | |
|---|---|
| *B22F 10/85* | (2021.01) |
| *B33Y 10/00* | (2015.01) |
| *B33Y 80/00* | (2015.01) |
| *B33Y 50/02* | (2015.01) |

(52) U.S. Cl.
CPC .......... *B22F 10/85* (2021.01); *B22F 2301/10* (2013.01); *B22F 2999/00* (2013.01); *B33Y 10/00* (2014.12); *B33Y 50/02* (2014.12); *B33Y 80/00* (2014.12)

(58) Field of Classification Search
CPC .. B22F 2301/10; B22F 2999/00; B22F 10/85; B33Y 10/00; B33Y 50/02; B33Y 80/00
See application file for complete search history.

(56) References Cited

U.S. PATENT DOCUMENTS

| | | | |
|---|---|---|---|
| 2005/0186361 A1 | 8/2005 | Fukuda et al. | |
| 2014/0147328 A1 | 5/2014 | Abe et al. | |
| 2017/0240736 A1* | 8/2017 | Farrar | B60R 21/215 |

FOREIGN PATENT DOCUMENTS

| | | | |
|---|---|---|---|
| CN | 105877879 A | | 8/2016 |
| CN | 106001568 A | * | 10/2016 |
| CN | 106073918 A | | 11/2016 |
| CN | 106313377 A | | 1/2017 |
| CN | 111067684 A | | 4/2020 |
| DE | 11 2012 002 221 T5 | | 2/2014 |
| JP | 10225939 A | * | 8/1998 |
| JP | H-10225939 A | * | 8/1998 |
| JP | 2000-000833 A | | 1/2000 |
| JP | 2004-001513 A | | 1/2004 |
| JP | 2010052279 A | * | 3/2010 |
| JP | 2019-217770 A | | 12/2019 |
| JP | 2020203418 A | * | 12/2020 |

(Continued)

OTHER PUBLICATIONS

Anton Jansson, Oscar Edholm, Scale factor and shrinkage in additive manufacturing using binder jetting, Skolan for industriell teknik och management, 2016 (Year: 2016).*

(Continued)

*Primary Examiner* — Anthony M Liang
*Assistant Examiner* — Jacob J Gusewelle
(74) *Attorney, Agent, or Firm* — Faegre Drinker Biddle & Reath LLP

(57) ABSTRACT

A method for manufacturing a slash molding mold includes: modeling a desired molded article by 3D CAD; and modeling, by 3D CAD, the slash molding mold in consideration of a predetermined shrinkage ratio with respect to the molded article. The method further includes: performing shaping using a metal 3D printer based on data of the slash molding mold.

6 Claims, 4 Drawing Sheets

(56) References Cited

FOREIGN PATENT DOCUMENTS

JP        2021030532 A  *  3/2021
WO     WO-03-096308 A1   11/2003

OTHER PUBLICATIONS

Marilyne Roumanie, Cecile Flassayer, Adrien Resch, Laurent Cortella, Richard Laucournet, Copper Printing by Digital Light Processing, Radtech 2020 (Year: 2020).*
Naamm, Nomma, (Metal Finishes Manual), National Association of Architectural Metal Manufacturers, 2006 (Year: 2006).*
Naamm, Nomma, (Metal Finishes Manual), National Association of Architectural Metal Manufacturers (Year: 2006).*
First Office Action issued on Apr. 6, 2023 in Chinese Patent Application No. 202210433540.3.
Practical thermoforming: principles and applications, (US) Florian, John; translated by Wenying Chen, China Petrochemical Press, Mar. 1992, pp. 278-284.
Biological 3D printing: from medical aids manufacturing to cell printing, Yong He, Jianzhong Fu, and Qing Gao, Huazhong University of Science and Technology Press, Jan. 2019, pp. 42-43.
Notice of Reasons for Refusal mailed Jun. 9, 2022 for JP2021-074168.
German Office Action issued Aug. 7, 2023 in Application No. 102022109896.6, with partial English translation.

* cited by examiner

METHOD FOR MANUFACTURING SLASH MOLDING MOLD

TECHNICAL FIELD

The present disclosure relates to a method for manufacturing a slash molding mold.

BACKGROUND ART

As one of methods for molding a resin material, slash molding is performed in the related art. JP2000-000833A discloses a slash molding mold in which a heat resistant heat insulating material is provided in an undercut forming portion. This related-art slash molding mold is manufactured by electroforming. As one method for manufacturing a slash molding mold including an electroforming step, a master mold of a desired molded article is formed by brazing (wax), and electroforming is performed using the master mold to manufacture a slash molding mold (a lost wax electroforming method).

In this method for manufacturing a slash molding mold, when a plurality of slash molding molds are manufactured, the slash molding is performed using a slash molding mold (a first manufactured slash molding mold) manufactured based on the master mold, and a plurality of products are produced. Then, by performing electroforming on the plurality of produced products, a plurality of slash molding molds can be manufactured. That is, the slash molding mold first produced by the electroforming is used as a prototype and is not used for the production of the product, and a mold produced based on a product produced based on the prototype is used for the production of the product.

SUMMARY OF INVENTION

In the slash molding, the product is molded by performing shrinking at a predetermined shrinkage ratio from a cavity shape of the slash molding mold. Therefore, in a case in which a plurality of slash molding molds are manufactured, a product obtained by performing shrinking by at least two times of slash molding with respect to the master mold formed by brazing (wax) is produced. In this case, the master mold based on design of a final product imaged by a designer and an actual product may be different from each other, and an impression of a shape or an appearance may be different from those of the product imaged by the designer. On the other hand, creation of the master mold in consideration of the shrinkage ratio for two times is a burden for the designer. Since the shrinkage performed by the slash molding is not uniform depending on the shape of the product, it is fairly difficult to create a master mold with which a product can be produced with the design intended by the designer.

An object of the present disclosure is to provide a method for manufacturing a slash molding mold with which a product faithful to design of a designer can be easily produced.

An aspect of the present disclosure provides a method for manufacturing a slash molding mold, the method including: modeling a desired molded article by 3D CAD; modeling, by 3D CAD, the slash molding mold in consideration of a predetermined shrinkage ratio with respect to the molded article; and performing shaping using a metal 3D printer based on data of the slash molding mold.

Another aspect of the present disclosure provides a method for manufacturing a slash molding mold, the method including: CT scanning an existing slash molding mold to obtain shape data of the existing slash molding mold and modeling a new slash molding mold by 3D CAD; and performing shaping using a metal 3D printer based on data of the new slash molding mold.

According to the above aspects, it is possible to provide a method for manufacturing a slash molding mold with which a product faithful to design of a designer can be easily produced.

DESCRIPTION OF EMBODIMENTS

Hereinafter, an embodiment of the present disclosure will be described. First, a known molding method can be used for slash molding performed using a slash molding mold manufactured according to the embodiment of the present disclosure. An outline thereof will be described. In manufacturing of a product performed using the slash molding mold, first, molten polyvinyl chloride (PVC) is poured into an inside (a cavity) of the slash molding mold by a predetermined amount, and a lower side with respect to an opening of the slash molding mold is placed in heating oil to heat the slash molding mold. Here, the slash molding mold is once taken out from the heating oil, the opening is set to the lower side, the slash molding mold is reversed, and PVC, which is a material, is fitted to a cavity surface of the slash molding mold. After the PVC has been fitted to the cavity surface, the slash molding mold is placed into the heating oil again. After predetermined time has elapsed, the slash molding mold is taken out from the heating oil and is cooled by air cooling, and the product formed of PVC cured in the cavity is taken out from the opening.

Since the PVC is a flexible material, the product formed of the molded and cured PVC can be easily taken out from the opening of the slash molding mold. Since the slash molding mold is formed of a copper alloy or pure copper, thermal conductivity is high. Therefore, when the slash molding mold containing the PVC is placed in the heating oil, the slash molding mold and the PVC are immediately heated, and when the slash molding mold is taken out from the heating oil, the slash molding mold is immediately cooled and the PVC is cured.

Next, as an embodiment of the present disclosure, a method for manufacturing a slash molding mold will be described with reference to FIGS. 1 to 3 and a flowchart in FIG. 4.

Molded Article Modeling Step (Step S10)

Figure 1:
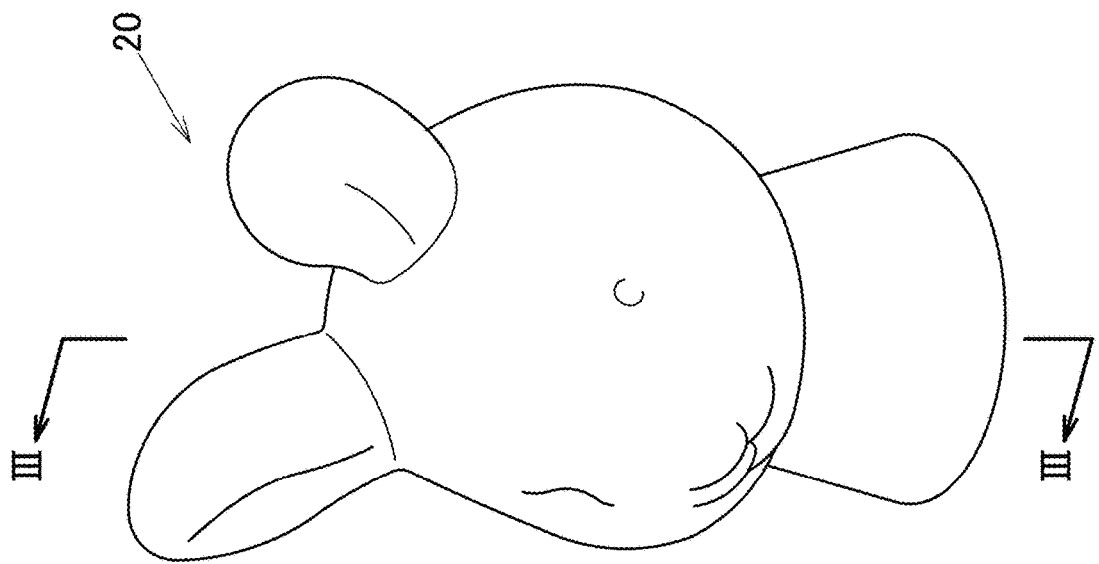
FIG. 1 is a perspective view showing a molded article and a slash molding mold that are modeled by 3D CAD according to an embodiment of the present disclosure.
Figure 1:
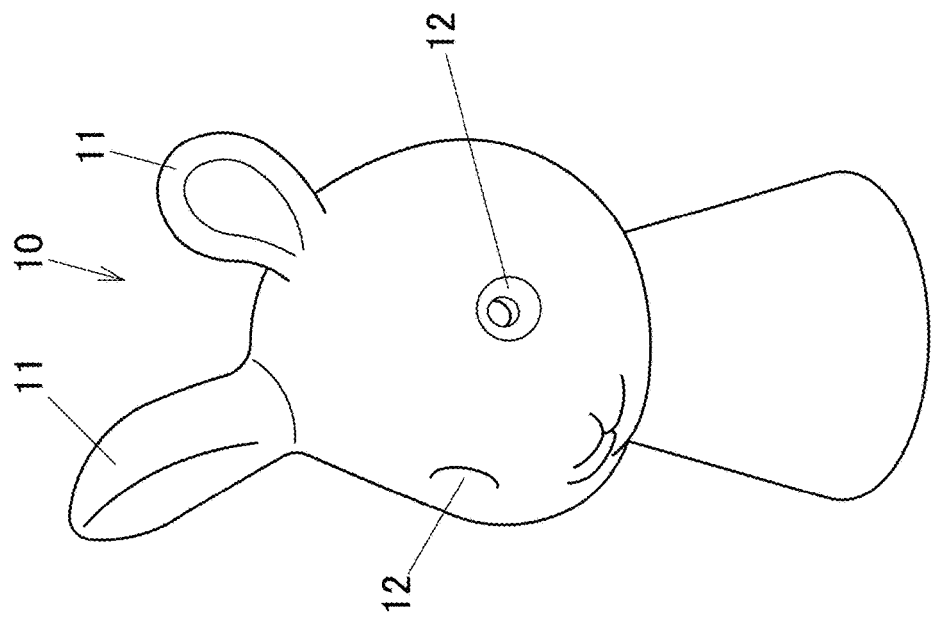
Figure 2:
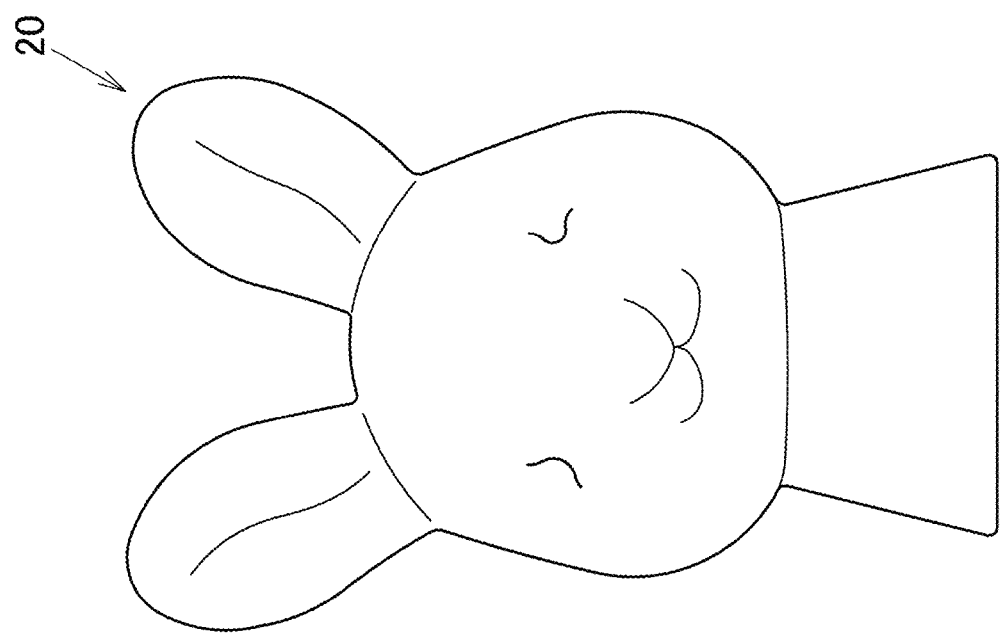
FIG. 2 is a front view showing the molded article and the slash molding mold that are modeled by 3D CAD according to the embodiment of the present disclosure.
Figure 2:
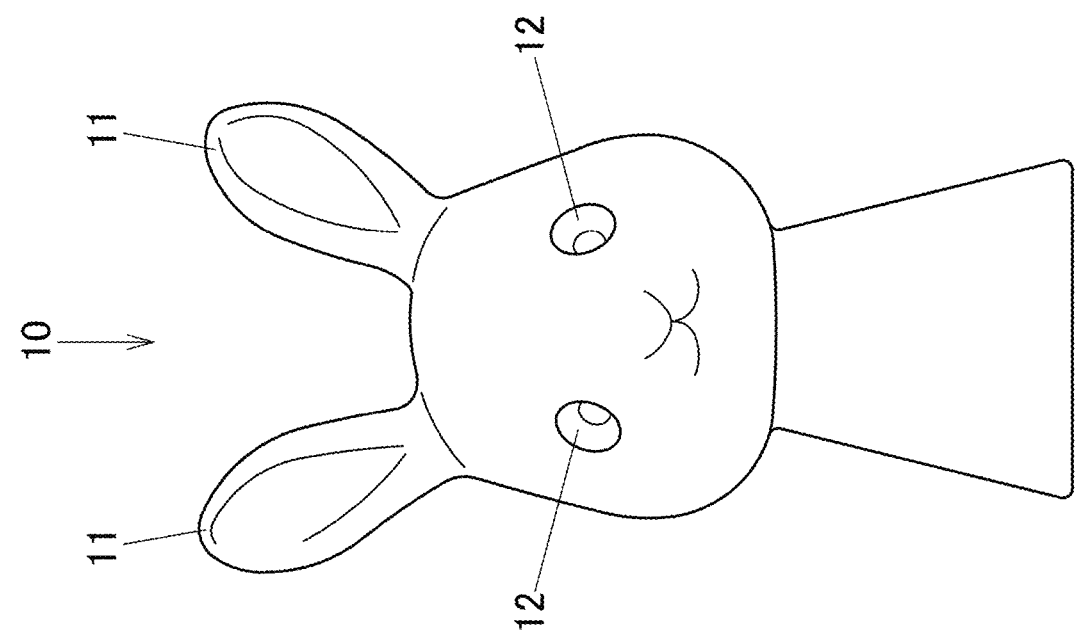

First, as shown in FIGS. 1 and 2, a molded article 10 to be formed into a product shape is modeled by three-dimensional computer-aided design (3D CAD). Here, in the present embodiment, a product having a shape of a doll simulating a rabbit is produced. A modeling operation of the molded article 10 is mainly performed by a designer. The designer performs modeling by designing the doll based on a concept of a toy using the product which is the molded article 10, a result of market research, and the like.

Mold Modeling Step (Step S20)

By 3D CAD, a slash molding mold 20 is modeled in consideration of a predetermined shrinkage ratio with respect to the molded article 10 modeled in the molded article modeling step. In a case of the molded article 10 having a simple shape, the predetermined shrinkage ratio can be uniformly obtained. However, in a case in which a protrusion (an ear portion 11 in the molded article 10), a recess (an eye portion 12), or the like is provided as in the doll, it is necessary to consider the shrinkage ratio according to a shape of the molded article 10 (see FIG. 3). This is because a cooling speed of each part of the mold is different depending on a shape of the mold in the slash molding. Therefore, since a modeling operation of the slash molding mold 20 requires knowledge and experience, the modeling operation is mainly performed by an operator having technical knowledge. In the present step, by adjusting the shape of the mold by 3D CAD, it is also possible to appropriately perform adjustment such as controlling a thickness of the slash molding mold and causing the shrinkage and a cooling rate of the product to be uniform.

Figure 3:
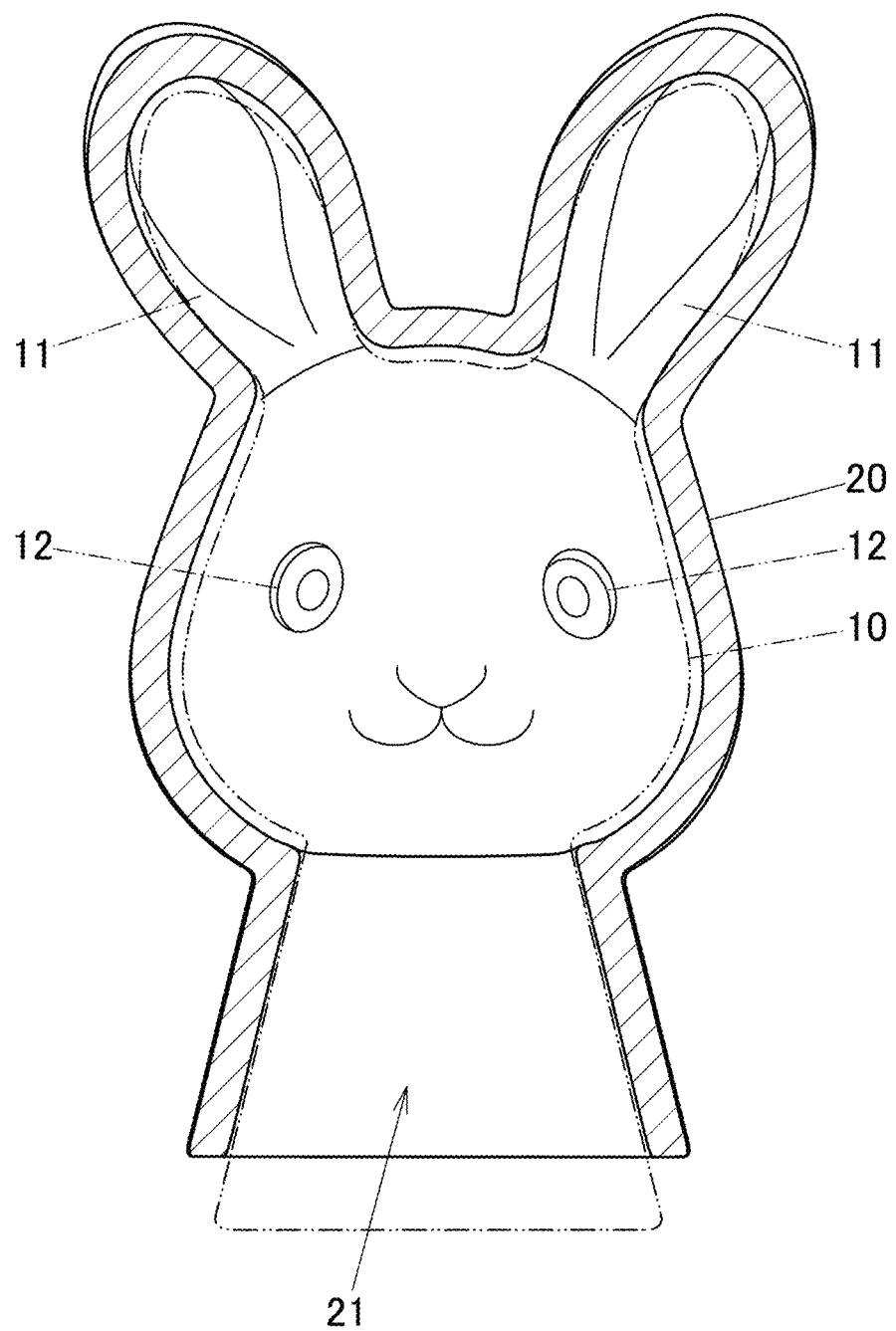
FIG. 3 is a cross-sectional view taken along a line III-III of the slash molding mold modeled by 3D CAD according to the embodiment of the present disclosure in FIG. 1, and is a cross-sectional view showing the molded article modeled by 3D CAD with a two-dot chain line.
Figure 4:
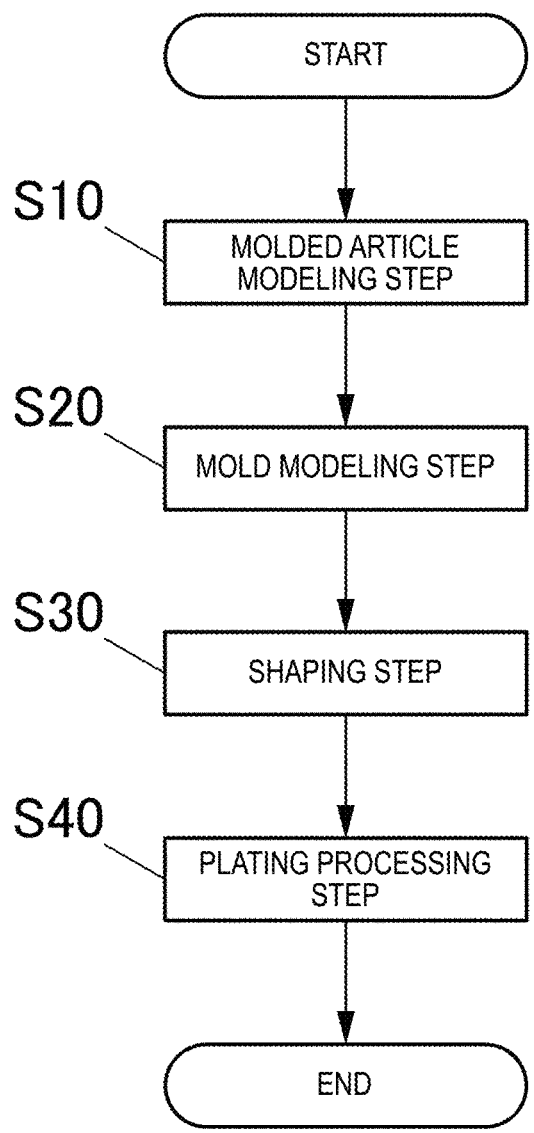
FIG. 4 is a flowchart showing steps of a method for manufacturing the slash molding mold according to the embodiment of the present disclosure.

Specifically, FIG. 3 shows a cross section of the slash molding mold 20, and shows the molded article 10 with a two-dot chain line. An opening is formed at a lower end of the slash molding mold 20, and a material is injected into a cavity 21 through the opening. A shape of the cavity 21 of the slash molding mold 20 is formed to be, for example, approximately 3% larger than that of the molded article 10 shown with the two-dot chain line. That is, in this case, the shrinkage ratio is 3% in the slash molding using the PVC. However, since it is expected that the cooling rate is high around a base portion of the ear portion 11, a dimensional difference between the cavity 21 and the molded article 10 is set to be small. That is, the shrinkage ratio is set according to the shape of the molded article 10. In the example in FIG. 3, the shrinkage ratio varies depending on portions of the molded article 10 in consideration of the shape of the molded article 10. For example, the shrinkage ratio is set in consideration of at least one of the protrusion and the recess of the molded article 10.

Shaping Step (Step S30)

Shaping is performed using a metal 3D printer based on data of the slash molding mold 20 modeled in the mold modeling step. The shaping performed by the metal 3D printer is performed using a metal material containing copper as a main material, a copper alloy, or pure copper. Various methods can be used for the metal 3D printer. For example, it is possible to use a powder bed method in which metal powder is spread and a metal of only a shaped part is melted and hardened with a laser beam or an electron beam, a metal deposition method in which spraying of the metal powder and irradiation with the laser beam are simultaneously performed to stack and solidify the molten metal on the shaped part, and an atomic diffusion additive manufacturing (ADAM) method in which laminating, solidifying, and shaping are performed according to a fused deposition modeling (FDM) method using a material obtained by mixing binder and metal powder. However, as the mold used for the slash molding, the metal 3D printer having a step of melting the metal powder with the laser beam is preferable because it is preferable to perform stacking densely without a gap.

Plating Processing Step (Step S40)

Plating processing is performed on an inner surface (a surface of the cavity 21) of a shaped object shaped by the metal 3D printer. This is to prevent corrosion due to gas generated in the slush molding. Therefore, the plating processing is preferably nickel chrome plating.

According to the method for manufacturing a slash molding mold having these steps, it is possible to eliminate a step performed by the electroforming with low accuracy, and it is possible to manufacture a slash molding mold with which a product closely matching a design image of the designer can be produced.

That is, in the related art, a plurality of slash molding molds are manufactured by further electroforming a product molded by a slash molding mold mainly formed according to a lost wax electroforming method. However, when the slash molding mold is manufactured by "copy of copy" of the master mold, the product is different from an original product image due to consideration of the shrinkage ratio or the like, or the shape is different among the plurality of slash molding molds, albeit minutely. Accordingly, even in the same product, a feeling of strangeness may be generated for an appearance depending on the molded mold. However, according to the present embodiment, it is possible to shape the slash molding mold 20 modeled in the mold modeling step with high accuracy by the metal 3D printer. Therefore, it is possible to reduce the feeling of strangeness between the products obtained by the individual slash molding molds performing molding.

As a modification of the present embodiment, instead of the molded article modeling step (step S10) and the mold modeling step (step S20), a CT scanning step of CT scanning an existing slash molding mold to obtain shape data of the existing slash molding mold and modeling a new slash molding mold is performed, and a shaping step (step S30) of performing shaping using the metal 3D printer based on the data of the slash molding mold modeled in the CT scanning step is performed, so that the slash molding mold can be manufactured.

In this case, for example, it is possible to produce a reprint of a doll toy that has already been sold. That is, if a slash molding mold for a product that has been sold in the past exists, shape data of an internal shape (a cavity shape) is acquired by performing CT scanning on the slash molding mold, so that the slash molding mold can be shaped and manufactured using the metal 3D printer based on the shape data. As described above, if the slash molding mold is manufactured by the highly accurate metal 3D printer without using the electroforming with low shape accuracy, it is possible to provide a product that does not cause the feeling of strangeness with the past product even if, for example, a product such as a doll sold in the past is sold as a reprint.

In modeling in the CT scan step, it is possible to appropriately correct a place where a molding defect is expected to occur. Alternatively, if there is no defect even if the acquired data of the existing slash molding mold is used as it is, modeling can be performed without correction, and modeling data can be transferred to a next step.

According to the embodiment of the present disclosure as described above, it is possible to provide a method for manufacturing a slash molding mold according to the following aspects.

A method for manufacturing a slash molding mold according to a first aspect includes: a molded article modeling step of modeling a desired molded article by 3D CAD; a mold modeling step of modeling, by 3D CAD, the slash molding mold in consideration of a predetermined shrinkage ratio with respect to the molded article modeled in the molded article modeling step; and a shaping step of performing shaping using a metal 3D printer based on data of the slash molding mold modeled in the mold modeling step.

According to this configuration, it is possible to manufacture the slash molding mold with high accuracy by the metal 3D printer without using a manufacturing method such as a lost wax electroforming method using the electroforming with low accuracy. Therefore, it is possible to provide the method for manufacturing a slash molding mold with which a product faithful to the design of the designer can be easily produced. According to the above-described configuration, even if a product has a fine convex shape (for example, an animal whisker) that cannot be formed in terms of strength with the wax prototype (the master mold) according to the lost wax electroforming method, it is possible to manufacture a slash molding mold for producing the product. It is not necessary to manufacture the wax prototype and transport the wax prototype for the electroforming, and it is also possible to eliminate a possibility of breakage of the wax prototype and the like.

Further, according to the above-described configuration, since the shaping is performed using the modeled shape data, it is possible to manufacture the same slash molding mold with high accuracy. According to the above-described configuration, it is possible to eliminate the manufacturing of the wax prototype and the step of the lost wax, and thus it is possible to reduce the steps. Further, a surface of the slash molding mold shaped by the metal 3D printer is satin finished. In the slash molding mold manufactured according to the lost wax electroforming method, for example, when electrostatic flocking is applied to a product, the surface is textured to form the satin finished surface in order to improve adhesiveness of an adhesive. In the slash molding mold manufactured according to the above-described configuration, since the cavity surface is satin finished by the metal 3D printer performing shaping, a texturing step can be eliminated. The production of the slash molding mold according to the above-described configuration is preferably high-mix low-volume production.

The method for manufacturing a slash molding mold according to a second aspect further includes a plating processing step of performing plating processing on a shaped object shaped in the shaping step.

According to this configuration, in particular, corrosion of the cavity surface can be reduced, and a life of the slash molding mold can be extended.

In the method for manufacturing a slash molding mold according to a third aspect, the metal 3D printer is configured to perform shaping using a metal material containing copper as a main material or pure copper.

According to this configuration, in the shaping of the product using the slash molding mold, it is possible to immediately heat and cool the slash molding mold.

In the method for manufacturing a slash molding mold according to a fourth aspect, the shrinkage ratio is a shrinkage ratio according to a shape of the molded article modeled in the molded article modeling step.

According to this configuration, since the shrinkage ratio is set according to the shape of the molded article, it is possible to produce a product in which the shape of the molded article that has been modeled is faithfully reproduced.

In the method for manufacturing a slash molding mold according to a fifth aspect, the shrinkage ratio varies depending on portions of the molded article modeled in the molded article modeling step.

According to this configuration, even in a case in which a cooling speed of each portion of the mold is different in the slash molding, it is possible to produce a product in which the shape of the molded article that has been modeled is faithfully reproduced.

In the method for manufacturing a slash molding mold according to a sixth aspect, the shrinkage ratio is a shrinkage ratio for which at least one of a protrusion and a recess of the molded article modeled in the molded article modeling step is taken into consideration.

According to this configuration, it is possible to produce a product in which the protrusion and the recess in the molded article that has been modeled are faithfully reproduced.

A method for manufacturing a slash molding mold according to a seventh aspect includes: a CT scanning step of CT scanning an existing slash molding mold to obtain shape data of the existing slash molding mold and modeling a new slash molding mold by 3D CAD; and a shaping step of performing shaping using a metal 3D printer based on data of the new slash molding mold modeled in the CT scanning step.

According to this configuration, it is possible to manufacture a plurality of slash molding molds with which a product such as a reprint can be produced in the same manner as the product manufactured in the past.

The embodiment of the present disclosure has been described above, and the present disclosure is not limited to the present embodiment. Alternatively, the present disclosure can be carried out with various modifications. For example, in the present embodiment, a product (a molded article) of a doll simulating a rabbit has been shown, and the present disclosure is not limited thereto. Alternatively, the present disclosure can be carried out by manufacturing a slash molding mold for molding various products.

What is claimed is:

1. A method for manufacturing a slash molding mold, the slash molding mold for manufacturing a molded article forming a doll, the molded article comprising at least one protrusion, at least one recess, and an electrostatic flocking portion, the method comprising:
    modeling the molded article forming the doll by 3D CAD, the molded article including the at least one protrusion, the at least one recess, and the electrostatic flocking portion;
    modeling, by 3D CAD, the slash molding mold in consideration of a predetermined shrinkage ratio with respect to the modeled molded article; and
    creating a slash molding mold, using a metal 3D printer, based on data of the modeled slash molding mold, wherein a satin finished surface is formed on a portion of the created slash molding mold, the portion of the created slash molding mold corresponding to the electrostatic flocking portion of the modeled molded article, to improve adhesiveness of an adhesive at the electrostatic flocking portion of the modeled molded article, wherein creating the slash molding mold, using the metal 3D printer, includes one or both of i) a metal deposition method in which spraying of a metal powder and irradiation with a laser beam are simultaneously performed to stack and solidify molten metal on a shaped part, and ii) an atomic diffusion additive manufacturing (ADAM) method in which laminating, solidifying, and shaping are performed according to a fused deposition modeling (FDM) method using a material obtained by mixing a binder and a metal powder, wherein an opening is formed at a lower end of the created slash molding mold, and a cavity of the created slash molding mold is accessible through the opening, wherein the method further comprising:

performing metal plating processing through the opening on an inner surface of the cavity of the created slash molding mold.

2. The method for manufacturing a slash molding mold according to claim 1, wherein the metal 3D printer is configured to create the slash molding mold using a metal material containing copper as a main material or pure copper.

3. The method for manufacturing a slash molding mold according to claim 1, wherein the predetermined shrinkage ratio is at least 3% of the molded article.

4. A method for manufacturing a slash molding mold, the slash molding mold for manufacturing a molded article forming a doll, the molded article comprising at least one protrusion, at least one recess, and an electrostatic flocking portion, the method comprising:

CT scanning an existing slash molding mold for manufacturing the molded article forming the doll to obtain shape data of the existing slash molding mold and modeling a new slash molding mold by 3D CAD, the new slash molding being a mold for the molded article forming the doll, the molded article including the at least one protrusion, the at least one recess, and the electrostatic flocking portion; and creating a slash molding mold, using a metal 3D printer, based on data of the new slash molding mold, wherein a satin finished surface is formed on a portion of the created slash molding mold, the portion of the created slash molding mold corresponding to the electrostatic flocking portion of the molded article, to improve adhesiveness of an adhesive at the electrostatic flocking portion of the molded article, wherein creating the slash molding mold, using the metal 3D printer, includes one or both of i) a metal deposition method in which spraying of a metal powder and irradiation with a laser beam are simultaneously performed to stack and solidify molten metal on a shaped part, and ii) an atomic diffusion additive manufacturing (ADAM) method in which laminating, solidifying, and shaping are performed according to a fused deposition modeling (FDM) method using a material obtained by mixing a binder and a metal powder, wherein an opening is formed at a lower end of the created slash molding mold, and a cavity of the created slash molding mold is accessible through the opening, wherein the method further comprising:

performing metal plating processing through the opening on an inner surface of the cavity of the created slash molding mold.

5. The method for manufacturing a slash molding mold according to claim 1, wherein the performing metal plating processing is nickel chrome plating.

6. The method for manufacturing a slash molding mold according to claim 1, wherein creating the slash molding mold, using the metal 3D printer, includes one or both of i) the metal deposition method and ii) the ADAM method, and further includes using a powder bed method in which a metal powder is spread and a metal of only a shaped part is melted and hardened with a laser beam or an electron beam.

* * * * *